United States Patent
Bravo et al.

(10) Patent No.: US 12,548,035 B2
(45) Date of Patent: Feb. 10, 2026

(54) DETERMINATION AND APPLICATION OF CONFIDENCE SCORES TO MITIGATE FRAUDULENT ACCOUNTS

(71) Applicant: Kyndryl, Inc., New York, NY (US)

(72) Inventors: Cesar Bravo, Alajuela (CR); Omar Odibat, Cedar Park, TX (US)

(73) Assignee: Kyndryl, Inc., New York, NY (US)

( * ) Notice: Subject to any disclaimer, the term of this patent is extended or adjusted under 35 U.S.C. 154(b) by 216 days.

(21) Appl. No.: 18/133,397

(22) Filed: Apr. 11, 2023

(65) Prior Publication Data

US 2024/0346525 A1    Oct. 17, 2024

(51) Int. Cl.
*H04M 15/00*    (2024.01)
*G06Q 30/018*   (2023.01)
*G06Q 50/26*    (2012.01)

(52) U.S. Cl.
CPC ....... *G06Q 30/0185* (2013.01); *G06Q 50/265* (2013.01)

(58) Field of Classification Search
CPC .......................... G06Q 30/0185; G06Q 50/265
USPC .................................................. 705/1.1–912
See application file for complete search history.

(56) References Cited

U.S. PATENT DOCUMENTS

| | | |
|---|---|---|
| 8,224,905 B2 | 7/2012 | Bocharov et al. |
| 8,271,588 B1 | 9/2012 | Bruno et al. |
| 9,497,216 B2 | 11/2016 | Khanna et al. |
| 10,333,964 B1 | 6/2019 | Freeman et al. |
| 2017/0223034 A1 | 8/2017 | Singh et al. |
| 2019/0166141 A1* | 5/2019 | Xu .......................... G06N 3/047 |
| 2021/0042767 A1* | 2/2021 | Guan ................. G06Q 30/0255 |
| 2021/0336983 A1 | 10/2021 | Lee et al. |
| 2022/0309516 A1* | 9/2022 | Rhoads ..................... G06N 5/01 |
| 2023/0336571 A1* | 10/2023 | Costa ....................... G06N 3/09 |

OTHER PUBLICATIONS

Trend, "Research, News, and Perspectives," Trend Micro Incorporated, 2023, 6 pages, retrieved from https://www.trendmicro.com/en_us/research.html.
Parkinson, H., "Instagram purge costs celebrities millions of followers," The Gaurdian, Dec. 19, 2014, 7 pages, retrieved from https://www.theguardian.com/technology/2014/dec/19/instagram-purge-costs-celebrities-millions-of-followers.

(Continued)

*Primary Examiner* — Jonathan P Ouellette
(74) *Attorney, Agent, or Firm* — CANTOR COLBURN LLP; Erik Swanson

(57) ABSTRACT

A computer-implemented method, according to one embodiment, includes receiving, from a user device, a request for determining a final confidence score for an account, and determining a plurality of confidence parameter scores using information associated with the account. A first of the confidence parameter scores is determined based on an analysis of a structure of the account, a second of the confidence parameter scores is determined based on a character analysis of at least the account, and a third of the confidence parameter scores is determined based on an exposure of the account. The method further includes using the determined confidence parameter scores to determine the final confidence score for the account. The determined final confidence score is applied to mitigate fraud.

18 Claims, 9 Drawing Sheets

(56) References Cited

OTHER PUBLICATIONS

Help Net Security, "789% year-over-year spike in malware and phishing," Help Net Security, Jun. 7, 2016, 5 pages, retrieved from https://www.helpnetsecurity.com/2016/06/07/ransomware-upsurge/.
Carroll, A.K., "5 Common Targets for Fake Listings Scams," Sift, Aug. 16, 2016, 5 pages, retrieved from https://blog.sift.com/fake-listings-scams/.
Daghter, V., "How to Avoid, Detect and Respond to Romance Scams," The Wall Street Journal, Sep. 1, 2016, 1 page, retrieved from https://www.wsj.com/articles/how-to-avoid-detect-and-respond-to-romance-scams-1472711402.
Rashid, F., "Tasty Spam: Affiliate Spammers Will Push Anything, Even Security Software," PCMag Newsletter, May 22, 2015, 12 pages, retrieved from https://www.pcmag.com/news/tasty-spam-affiliate-spammers-will-push-anything-even-security-software.
Ward, C., "17 Types of Link Spam to Avoid," MOZ, May 15, 2012, 13 pages, retrieved from https://moz.com/blog/17-types-of-link-spam-to-avoid.
Whois, "Every Great Idea Starts with a Great Domain Name," Whois, 2023, 3 pages, retrieved from https://www.whois.com/.
Wikipedia, "Trend Micro," Wikipedia, 2023, 8 pages, retrieved from https://en.wikipedia.org/wiki/Trend_Micro.

* cited by examiner

| Feature | Example 1 "johnsmith1995@" | Example 2 "jj.7n_ss_mm_452223@" |
|---|---|---|
| % of letters | Confidence = 5 (High) | Confidence = 2 (Low) |
| % of special letters | Confidence = 5 (High) | Confidence = 2 (Low) |
| % of repeated characters | Confidence = 5 (High) | Confidence = 2 (Low) |

| "johnsmith1995@email.com" | "jj.7n_ss_mm_452223@email.com" |
|---|---|
| Substring = 2<br>{johnsmith, 1995} | Substring = 10<br>{jo,.,7,n,_,sm,_,th,_,452223} |

| "johnsmith1995@email.com" | "jj.7n_ss_mm_452223@email.com" |
|---|---|
| 2 matches found = john and smith<br>Probability of name = 5 (High) | 0 matches found<br>Probability of name = 0 (negligible) |

| "johnsmith1995@email.com" | "jj.7n_ss_mm_452223@email.com" |
|---|---|
| 1 match found = 1995<br>Probability of year = 5 (High) | 0 matches found<br>Probability of year = 0 (negligible) |

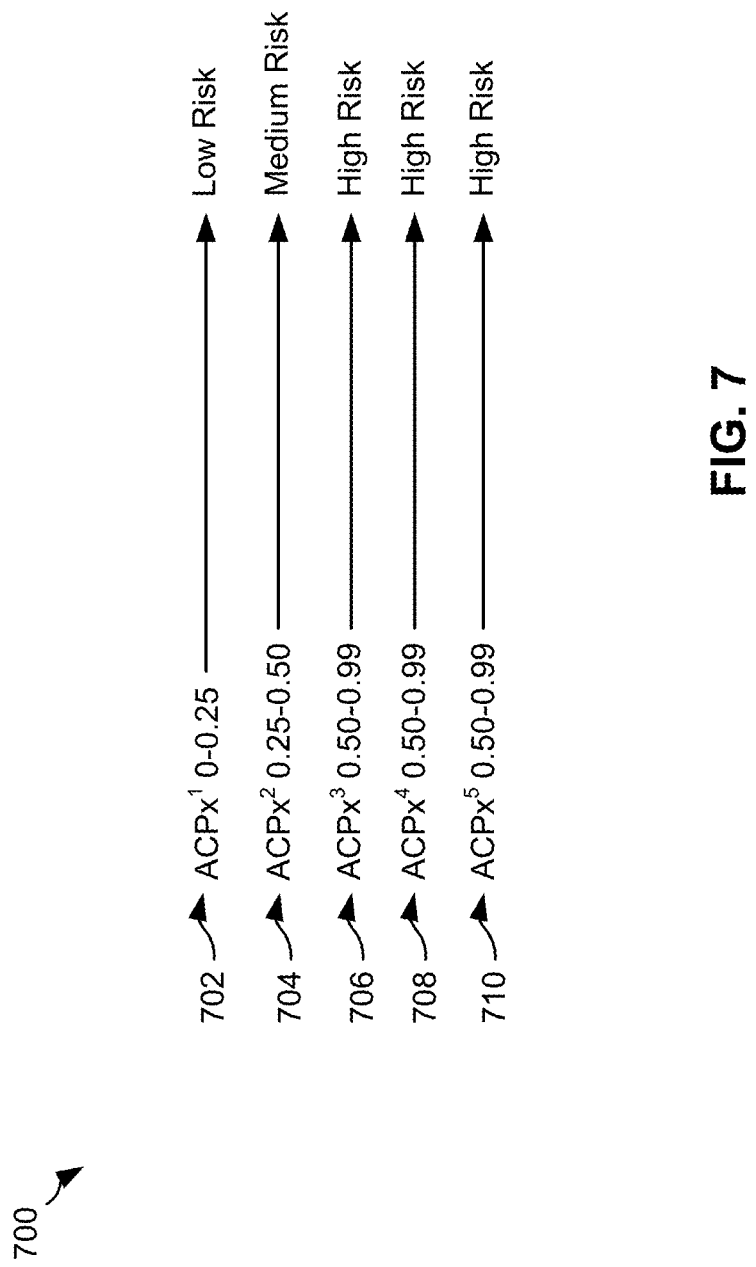

DETERMINATION AND APPLICATION OF CONFIDENCE SCORES TO MITIGATE FRAUDULENT ACCOUNTS

BACKGROUND

The present invention relates to accounts, and more specifically, this invention relates to determining a plurality of confidence parameter scores using information associated with an account and using the determined confidence parameter scores to determine a final confidence score for the account.

Accounts are typically user-specific profiles that are generated with respect to a platform such as an application. Email accounts are typically provided, e.g., by an input on a user device, during the creation of an account, and typically include a username portion and a domain portion. A provided email account may thereafter be used for a plurality of intended purposes with respect to the account. For example, an email account may be used as a username to log into a social media account. In another example, an email account may be used to recover and/or reset a password in situations in which a user remembers their username for an application account but forgets their password. However, accounts are not always made and used for such intend purposes. The creation of fake accounts affects many industries. For example, within Software As a Service (Saas), free accounts are sometimes created to abuse free services.

SUMMARY

A computer-implemented method, according to one embodiment, includes receiving, from a user device, a request for determining a final confidence score for an account, and determining a plurality of confidence parameter scores using information associated with the account. A first of the confidence parameter scores is determined based on an analysis of a structure of the account, a second of the confidence parameter scores is determined based on a character analysis of at least the account, and a third of the confidence parameter scores is determined based on an exposure of the account. The method further includes using the determined confidence parameter scores to determine the final confidence score for the account. The determined final confidence score is applied to mitigate fraud.

A computer program product, according to another embodiment, includes a computer readable storage medium having program instructions embodied therewith. The program instructions are executable by a computer to cause the computer to perform the foregoing method.

A system, according to another embodiment, includes a hardware processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is a representation, in accordance with one embodiment of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining a plurality of confidence parameter scores using information associated with an account and using the determined confidence parameter scores to determine a final confidence score for the account.

In one general embodiment, a computer-implemented method includes receiving, from a user device, a request for determining a final confidence score for an account, and determining a plurality of confidence parameter scores using information associated with the account. A first of the confidence parameter scores is determined based on an analysis of a structure of the account, a second of the confidence parameter scores is determined based on a character analysis of at least the account, and a third of the confidence parameter scores is determined based on an exposure of the account. The method further includes using the determined confidence parameter scores to determine the final confidence score for the account. The determined final confidence score is applied to mitigate fraud.

In another general embodiment, a computer program product includes a computer readable storage medium having program instructions embodied therewith. The program instructions are executable by a computer to cause the computer to perform the foregoing method.

In another general embodiment, a system includes a hardware processor, and logic integrated with the processor, executable by the processor, or integrated with and executable by the processor. The logic is configured to perform the foregoing method.

Figure 1:
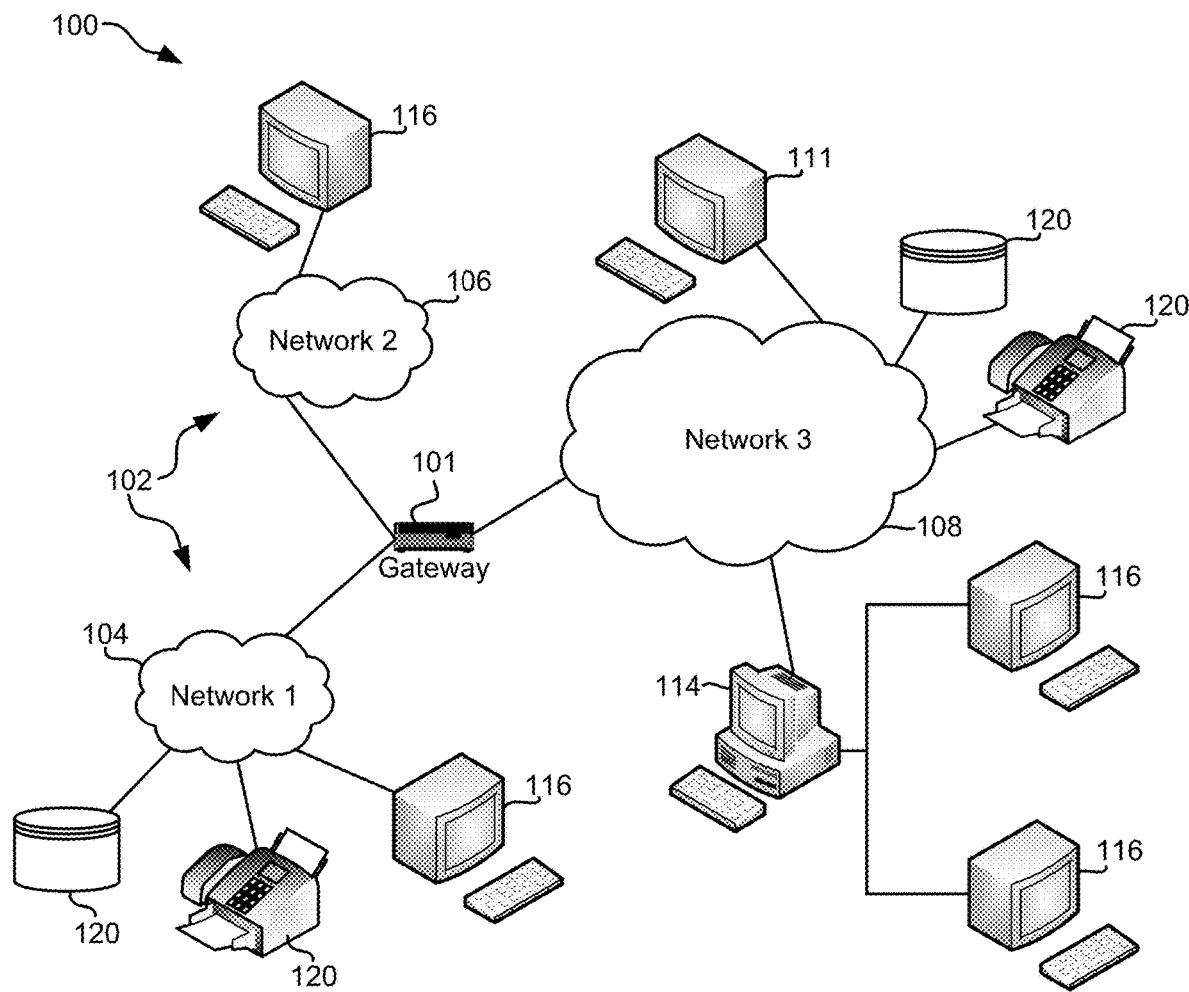
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
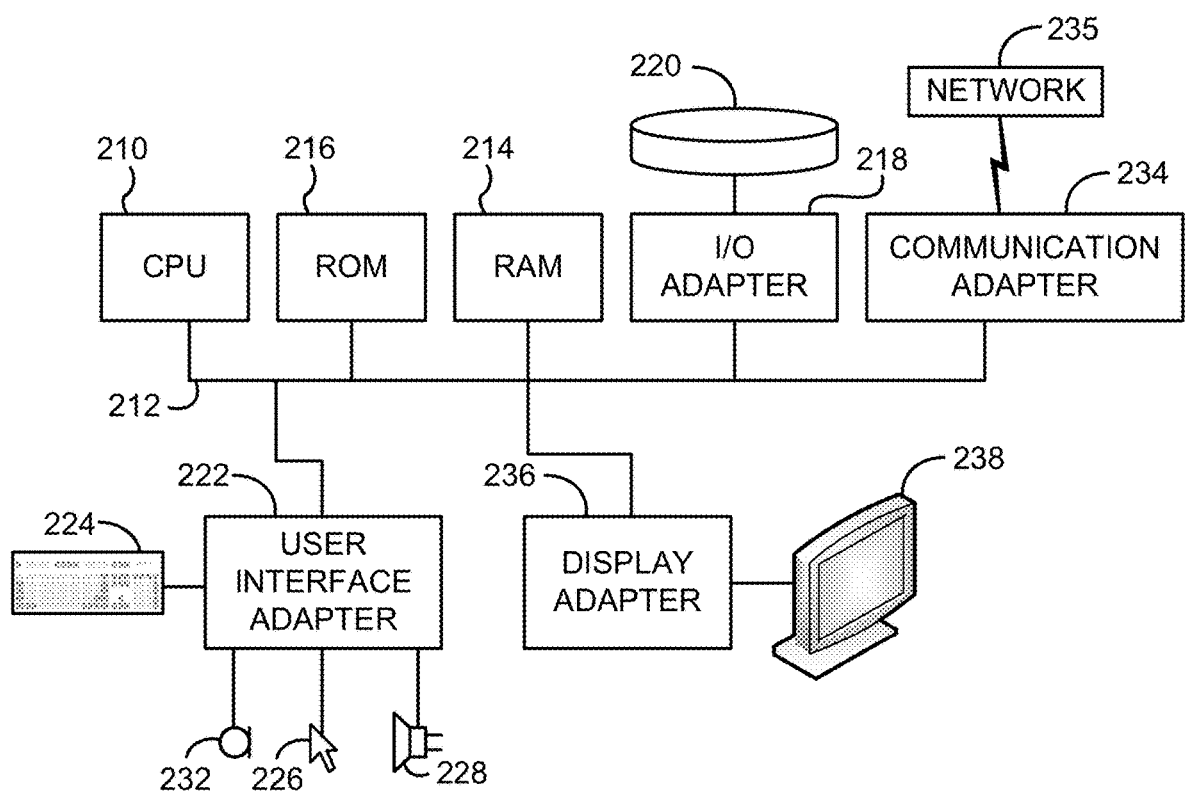
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using extensible Markup Language (XML), C, and/or C++ language, or other programming languages, along with an object-oriented programming methodology. Object-oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As mentioned elsewhere above, accounts are typically user-specific profiles that are generated with respect to a platform such as an application. Email accounts are typically provided, e.g., by an input on a user device, during the creation of an account, and typically include a username portion and a domain portion. A provided email account may thereafter be used for a plurality of intended purposes with respect to the account. For example, an email account may be used as a username to log into a social media account. In another example, an email account may be used to recover and/or reset a password in situations in which a user remembers their username for an application account but forgets their password. However, accounts are not always made and used for such intend purposes. The creation of fake account affects many industries. For example, within Software As a Service (SaaS), free accounts are sometimes created to abuse free services.

Another industry in which fake accounts are sometimes used other than for an intended purpose involves the banking industry. For example, fake accounts are sometimes generated on a relatively large scale and used in a plurality of attempts to create bank accounts, e.g., in order to obtain sign-up incentives, receive a credit line that a user having control of the fake account intends to use and not pay back, etc. Malware is another area in which fake accounts are used. There is a reason cybersecurity advocates recommend being particularly wary about clicking links. This is because a user presented with the link typically has difficulty determining whether a spammy link is just a ploy to route traffic to a website, or if the link actually leads to a malicious site that results in malware being installed on the user's computer.

Likes, reviews, and other social networking statistics may be boosted by the application of fake accounts. Fraudulent actors may create fake accounts en masse to boost a business' status (through all kinds of social actions), or to damage a competitor's reputation by leaving relatively low reviews. The business of fake social network likes, followers, and reviews is relatively extensive. For example, the recent purging of fake social media accounts resulted in some users losing millions of followers, e.g., fake accounts following the social media account. Phishing and spear-phishing is another field that should be mentioned when considering fake accounts. Phishing may sound outdated, but in fact, phishing has never gone away. In fact, it is thought that the prevalence of phishing attempts has grown hundreds of percent year over year. In phishing, cybercriminals may create fake accounts to send phishing messages, and may even establish entire identities with large social networks so that the phishing message seems credible. These messages may appear quite authentic, and often include some personal details about the recipient (gleaned from social networks), and/or may even appear to come from someone that the recipient personally knows. These fake accounts use the phishing messages to steal personal information, which is embarrassing, expensive and frustrating for users who are victims of the phishing instance to recover from.

Listings scams are another concept in which fake accounts are fraudulently used. Whether the listing scam happens on a classified listings site, a property rental platform, a job board, or someplace else, a fake listings scam takes advantage of the trust a user has in an online marketplace. Fraudsters create fake accounts, upload scraped images, and often try to convince users to wire money or accept a phony cashier's check as payment. Similar to listings scams, romance scams rely on gaining the victim's trust, but in this case, the trust is typically gained over the course of weeks, months, or even years. Romance scams cost victims more than $120 million in the first half of 2016 alone, according to the Federal Bureau of Investigation (FBI). These fake account driven scams do not just originate on dating sites; scammers may create fake profiles on any platform where people congregate and may be open to making a new friend. This includes social networks and online forums.

Affiliate link spam is another means by which fake accounts are used to exploit unsuspecting users. Affiliate link spam often resides within comment threads or messages filled with fervent entreaties to buy discounted products, suggestions to navigate to a specified social media page, offers to work from home for relatively large sums of money, etc. These spam messages may contain promotional links, and affiliates make money from every page visit driven via their link, and even more money if the clicking user signs up. These affiliate links can lead to everything from legitimate brand sites to relatively more questionable sites. Some fake accounts are set up solely for the purpose of promoting as many spammy affiliate links as possible until they are shut down. Search Engine Optimization (SEO) is the theory that adding enough links to a site around the web will result in these inbound links doing great things for the SEO. While the value of spammy links to a site's overall SEO strategy is questionable, there are still plenty of fake accounts created simply for the purpose of scattering these links all over the web.

With reference now to executive summaries, all websites and apps require an email address to create an account. Accordingly, the genesis of many fake accounts is a disposable email domain. There are a number of services that provide fraudulent users with a temporary email address and even allow them to confirm the email. With a thriving market for people who offer to create multiple fake accounts on someone else's behalf to spam, write fake reviews, or create SEO links, there is no shortage of interest for using such services. Current protection systems are often overpassed by using several techniques such as private proxies, randomize page load time, scrape images and data from other profiles, other related tactics, etc. Accordingly, there is a longstanding need for techniques that relatively effectively identify "fake" email accounts that are created for non-legitimate purposes such as scams, fraud, etc.

In sharp contrast to the deficiencies of the conventional techniques described above, the techniques of embodiments and approaches described herein analyze and cluster a set of unique characteristics of an account to determine a confidence parameter score of the account. Each confidence parameter score may preferably be generated by a separate trained machine learning (ML) model that is optimized for determining that confidence parameter score, e.g., "base learners." Thereafter, results from each trained ML model are fed as input to a second layer classifier that predicts the final risk score for the email address, and also generates a "final confidence score." In some approaches, in response to a determination that the email address is predicted to be risky, one or more flags are generated in order to indicate this prediction. These flags are generated by ranking the confidence scores of the "base learners."

Figure 3A:
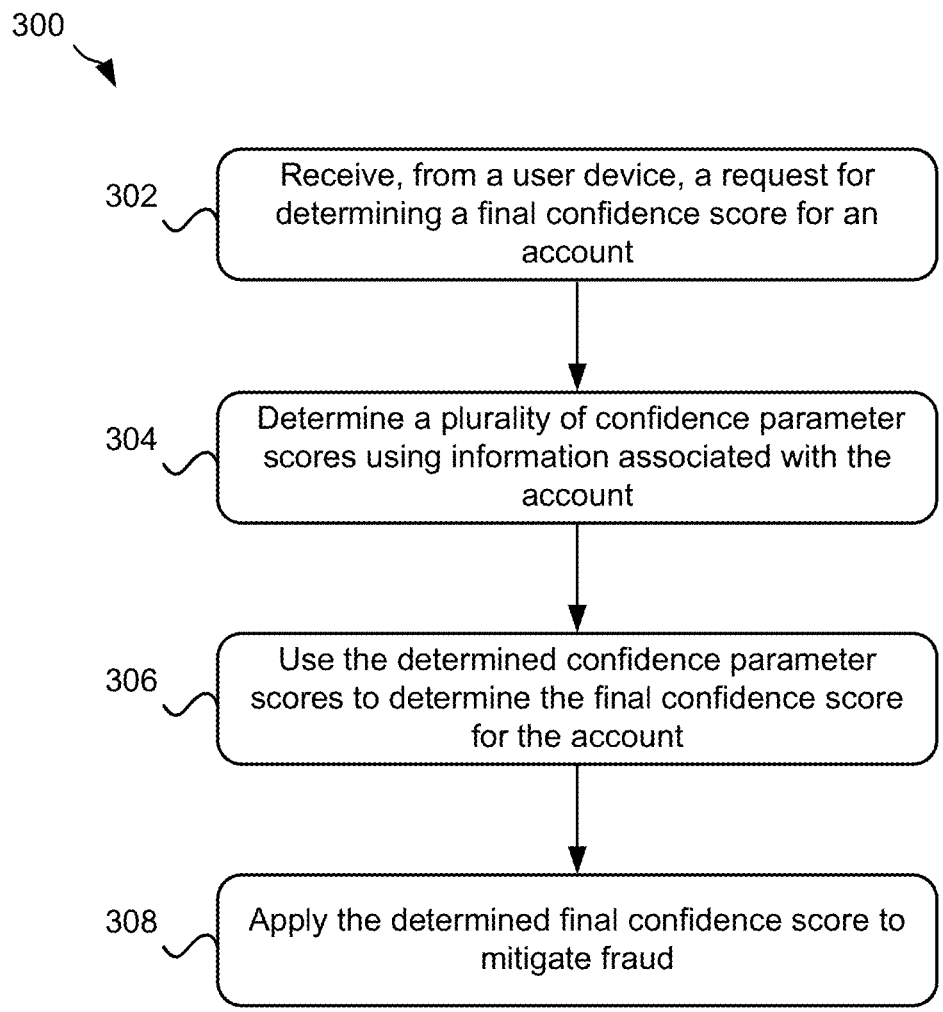
FIG. 3A is a flowchart of a method, in accordance with one embodiment of the present invention.

Now referring to FIG. 3A, a flowchart of a method 300 is shown, according to one embodiment. The method 300 may be performed in accordance with the present invention in any of the environments depicted in any of the other FIGS., among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Method 300 may, in some approaches, be performed using a computerized system, as the method 300 cannot practically be performed by a human, given the complexities of the calculations and sheer amount of data that is processed. Moreover, any attempt by a human to perform such method 300 would be expected to be rife with errors, again given the complexities of the calculations and sheer amount of data that is processed.

It may be prefaced that the operations of method 300 preferably do not collect and/or analyze user information without explicit permission from users to do so. In sharp contrast to collecting and analyzing user information without explicit permission from users to do so, the operations described herein protect personal and confidential user data by performing operations to determine a final confidence score that is applied to mitigate fraud. As indicated elsewhere above, fake accounts are relatively frequently responsible for exploiting user data by dishonestly tricking users into trusting the fake account (that is not known to be fake to the tricked users) and thereafter fraudulently stealing from the tricked users, e.g., stealing money, stealing private information, stealing time, etc. Accordingly, the techniques described herein ultimately protect user data. Furthermore, the techniques described herein improve performance of computer systems that are subject to receiving notifications from fake accounts, e.g., subject to being approached and exploited by fake accounts. These performance improvements specifically result from processing potential being preserved by fake accounts being mitigated by being flagged before having the opportunity to attempt to exploit users of the computer systems.

Operation 302 of method 300 includes receiving, from a user device, a request for determining a final confidence score for a predetermined account, e.g., a predetermined email account. For context, the request for determining the final confidence score for the account may be a request for a predetermined verification process to be performed on the account in order to determine whether the account is in fact a legitimate account, e.g., an account used for a predetermined purpose, or a fraudulent account, e.g., an account not used for an in intended purpose but instead used for one of the fake account purposes described elsewhere above.

In some approaches, the request for determining the final confidence score for the account is received in response to a determination that the account does not have at least one predetermined authentication credential associated therewith. For example, in some approaches, the request is received in response to a determination that a final confidence score has not previously been determined for the account. In some other approaches, the request may be received in response to a determination that a user device associated with the account has performed a predetermined trigger operation, e.g., requested data that the account is not allowed to access, been used for an attempted login at more than one location within a predetermined amount of time, re-requesting access more than a predetermined number of times within a predetermined amount of time, etc.

The user device from which the request is received may, in some approaches, be associated with and/or manage a service and/or site that is attempting to be accessed by a user device using the account as a login credential and/or username.

In response to receiving the request, a plurality of confidence parameter scores may be determined using information associated with the account, e.g., see operation 304. Each of the confidence parameter scores may be based on different predetermined information associated with the account. Furthermore, each of the confidence parameter scores may be determined using different predetermined techniques, e.g., which may each be applied by a different trained ML model. Illustrative examples of such techniques are described elsewhere herein, e.g., see FIG. 3B.

Operation 306 includes using the determined confidence parameter scores to determine the final confidence score for the account. In some approaches, the determined confidence parameter scores may be input into a predetermined classifier to determine the final confidence score for the account. The determined final confidence score for the account may then be applied to mitigate fraud, e.g., see operation 308. For context, in some approaches, in order to mitigate fraud, a determination is made as to whether the final confidence score account indicates an unacceptable amount of risk, e.g., is more likely than not a fraudulent account that is capable of causing the relatively expensive and processing intensive recovery operations described above. For example, in some approaches, application of the final confidence score for the account may include comparing the determined final confidence score to a predetermined fraud mitigation threshold, and in response to a determination that the determined final confidence score matches or exceeds the predetermined fraud mitigation threshold, performing one or more predetermined fraud mitigation operations. For example, a first of such predetermined fraud mitigation operations may include outputting a first flag to the user device to indicate that the account is fraudulent. This identification of fake accounts and performance of the fraud mitigation operation preserves a relatively significant amount of processing potential that would otherwise be expended in recovering from interacting with such fake accounts. Note that further predetermined fraud mitigation operations, as well as techniques for setting and dynamically adjusting the predetermined fraud mitigation threshold, are described in greater detail elsewhere below, e.g., see FIG. 3B. In contrast, in response to a determination that the determined final confidence score is less than the predetermined fraud mitigation threshold, a second flag that indicates that the account is not fraudulent may be output to the user device.

Figure 3B:
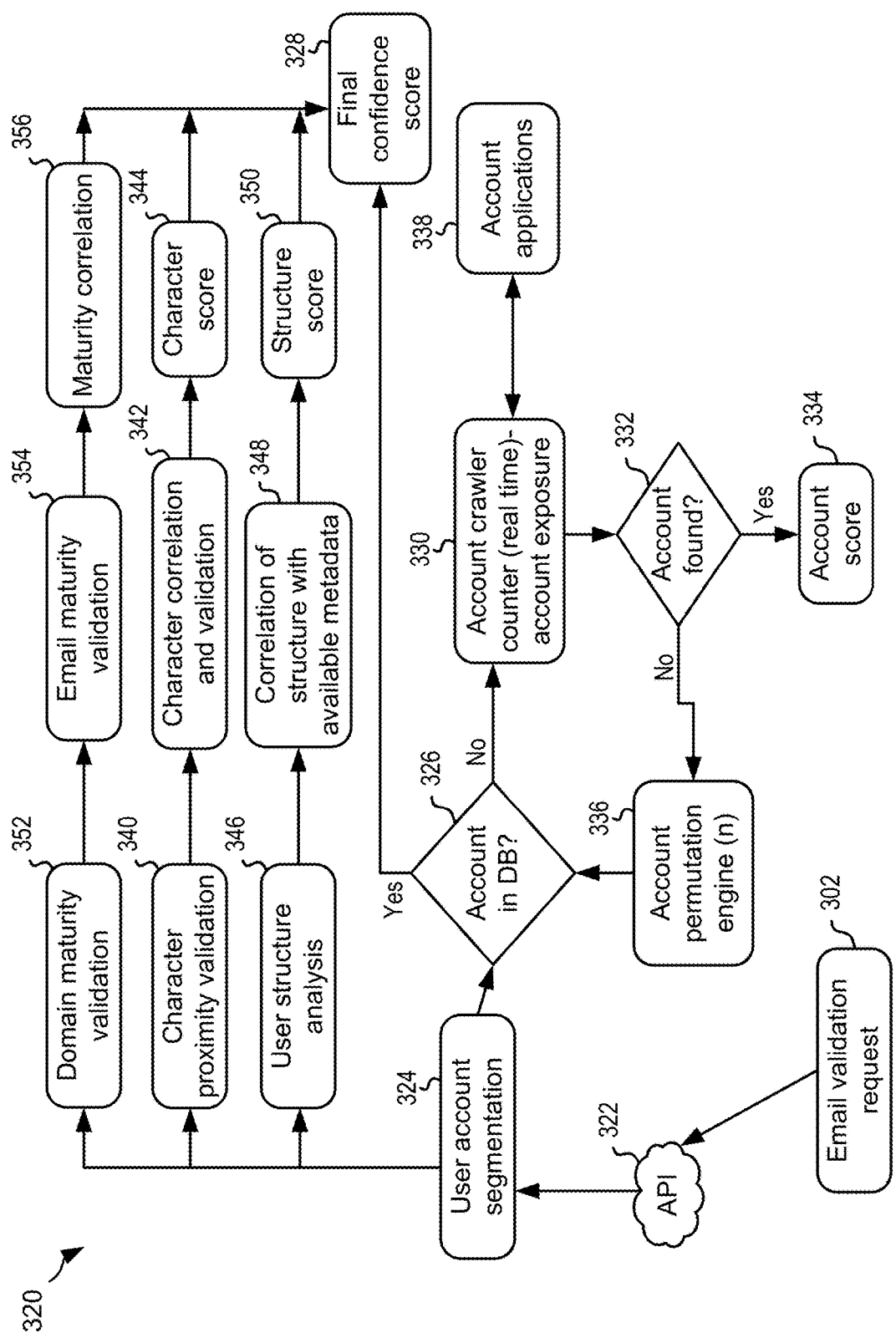
FIG. 3B is a flowchart of a method, in accordance with one embodiment of the present invention.

It may be prefaced that, in some approaches, the flowchart of FIG. 3A illustrates a relatively high level overview of the flowchart of FIG. 3B. Accordingly, the flowchart of FIG. 3A and the flowchart of FIG. 3B share some common numbering. For example, operation 304 of FIG. 3A includes determining a plurality of confidence parameter scores using information associated with the first account, while various portions of the flowchart of FIG. 3B include logical paths of operations detailing how, according to some approaches, such confidence parameter scores are determined. According to another example, each of the flowcharts of FIG. 3A and FIG. 3B include receiving the request, e.g., see operation 302.

Now referring to FIG. 3B, a flowchart of a method 320 is shown, according to one embodiment. The method 320 may be performed in accordance with the present invention in any of the environments depicted in any of the other FIGS., among others, in various embodiments. Of course, more or fewer operations than those specifically described in FIG. 3B may be included in method 320, as would be understood by one of skill in the art upon reading the present descriptions.

Each of the steps of the method 320 may be performed by any suitable component of the operating environment. For example, in various embodiments, the method 320 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 320. Illustrative processors include, but are not limited to, a central processing unit (CPU), an application specific integrated circuit (ASIC), a field programmable gate array (FPGA), etc., combinations thereof, or any other suitable computing device known in the art.

Method 320 is performed using a computerized system, as the method 320 cannot practically be performed by a human, given the complexities of the calculations and sheer amount of data that is processed. Moreover, any attempt by a human to perform such method 320 would be expected to be rife with errors, again given the complexities of the calculations and sheer amount of data that is processed.

Operation 302 of method 320 includes receiving, from a user device, a request for determining a final confidence score for a predetermined account. In one preferred approach, the account may have an address such as an email account, e.g., exampleemail@email.com. The account may, in some approaches, include a domain portion of the address of the account, e.g., "email.com", and a username portion of an address of the account, e.g., "exampleemail".

In some approaches, the request for determining the final confidence score for the account is received by an application programming interface (API) 322 and/or according to a predetermined API specification.

Upon receiving the request for determining the final confidence score for the account, an address for the account may be segmented, e.g., see user account segmentation module 324. Techniques for segmenting an account address that would become apparent to one of ordinary skill in the art upon reading the descriptions herein may be used, in some approaches. In some approaches, performing the segmentation includes determining a domain portion of the address of the account and/or a username portion of the address of the account.

Method 320 includes determining a plurality of confidence parameter scores using information associated with the account. In some approaches, in the process of determining the confidence parameter scores, it may be determined whether the account exists in a predetermined database (DB), e.g., see decision 326. The predetermined database may, in some approaches, be a local database, e.g., local with respect to a user device such as a computer that receives the request. In some other approaches, the database may additionally and/or alternatively be a non-local database, e.g., of a cloud storage platform.

For context, in some approaches, the account may already "exist" in the predetermined database in that the account may have previously been considered in a previous iteration of method 320, and therefore, at least some confidence parameter scores and/or a final confidence score may have already been determined for the account. In some other approaches, at least some confidence parameter scores and/or a final confidence score may have already been determined by other techniques and access to such scores may be potentially available for accessing in an optional operation of method 320. It should be noted that processing resources are potentially preserved as a result of first checking to determine whether the account exists in the predetermined database. This is because processing resources are not expended on determining at least some confidence parameter scores and/or a final confidence score where such scores are determined to be otherwise available. Accordingly, in response to a determination that the account already exists in the predetermined DB, e.g., as illustrated by the "Yes" logical path of decision 326, method 320 optionally continues to operation 328, and the final confidence score is accessed. The final confidence score may be applied to mitigate fraud using one or more of the techniques described elsewhere herein for applying a final confidence score.

In response to a determination that the account does not already exist in the predetermined DB, e.g., as illustrated by the "No" logical path of decision 326, method 320 optionally continues to operation 330, where an account confidence parameter score of the confidence parameter scores is determined based on an exposure of the account, e.g., hereafter referred to as the account exposure confidence parameter score. In some preferred approaches, the account exposure confidence parameter score is determined using a predetermined catalog model and/or a predetermined external model, each of which will now be described below.

A catalog model for determining the account exposure confidence parameter score may, in some approaches, be determined by building a plurality of lookup tables. One or more of the lookup tables may be based on predetermined factors that may be associated with the account, e.g., email addresses, domains, Internet Protocol (IP) addresses, etc. In other words, in some approaches, each of the tables may be built to include information that is based on a different one of the predetermined factors. Corresponding risk values may be calculated and stored as values in the tables. For example, in some approaches, building the lookup tables includes calculating risk scores for the account. These risk scores may, in some approaches, be calculated by comparing the domain portion of the address of the account to a predetermined list of accepted domains. Accounts having an address that is not included on the predetermined list of accepted domains are determined to have relatively higher risk scores than an account having an address that is included on the predetermined list of accepted domains. Note that the accepted domains may, in some approaches, be of a host company that monitors for a predetermined use characteristic to recycle fraudulent accounts, e.g., non-active accounts, sporadically used accounts, accounts that have greater than a predetermined number of login attempts on one or more sites within a predetermined amount of time, etc. In some approaches, one or more account crawlers, e.g., a real time account crawler, that would become apparent to one of ordinary skill in the art upon reading the descriptions herein, may be used to determine whether the username portion of the account address and/or the domain portion of the account address has been banned by one or more other entities, e.g., companies, domains, government regulations, etc.

Building the lookup tables may additionally and/or alternatively include calculating risk scores for at least some usernames having at least a predetermined degree of similarity with a username portion of an address of the account. In some approaches, one or more account crawlers, e.g., a real time account crawler, that would become apparent to one of ordinary skill in the art upon reading the descriptions herein, may be used to determine the usernames having at least a predetermined degree of similarity and information associated therewith. This determined information and usernames may be used to determine risk scores using techniques similar to those described above for determining calculating risk scores for the account. For example, the same and/or different account crawlers may be used to determine whether the username portion of the account address and/or the domain portion of the other accounts determined to have a predetermined degree of similarity with the account associated with the received request have been banned by one or more other entities, e.g., companies, domains, government regulations, etc. In response to a determination that these other accounts are determined to be banned, the account associated with the received request may be assigned a relatively high risk score in one or more of the tables. In contrast, in response to a determination that these other accounts are determined to not be banned and/or no other such accounts exist, the account associated with the received request may be assigned a relatively low risk score in one or more of the tables.

The calculated risk scores may be stored in an associated one of the tables. In some approaches, the account exposure confidence parameter score may then be determined. For example, in one of such approaches, the account exposure confidence parameter score is a weighted average of the calculated risk scores. In some approaches, different predetermined hyperparameters may be applied to the different calculated risk scores in order to apply different weights to the different calculated risk scores in the determination of the account exposure confidence parameter score.

An illustrative example of the catalog model for determining the account exposure confidence parameter score will now be described below. It may be assumed that a new request is received for determining a final confidence score for an account having an address "jnsmhjth19@exampleemail.com". A catalog score may be generated from lookup tables. For example, a search may be performed on an email table to determine if the entire email address "jnsmhjth19@ exampleemail.com" is found. In response to a determination that the email is found, a stored risk value of the table may be returned. In response to a determination that the email is not found, a search for a username portion of the account may be performed, e.g., a search for "jnsmhjth19". In response to the search finding a result for only the username portion of the account, a stored risk value for the username is used. Otherwise, the risk score may be calculated using the K-closest usernames of the username, e.g., where the value of the "K" variable is predetermined. In some approaches, a predetermined fuzzy matching algorithm may, in some approaches, be used to determine the K-closest usernames of the username of the account. In some of such approaches, the predetermined fuzzy matching algorithm is a Levenshtein algorithm. For example, close usernames of the username of the account may be determined to include, e.g., "jnsmhjth18", "jnsmhjth1", "jnsmhjth196", etc. The account exposure confidence parameter score may be a weighted average of the calculated risk scores, e.g., an average of the determined "K" usernames, where the weight is the similarity score calculated by the fuzzy matching algorithm.

An external score model may additionally and/or alternatively be used for determining the account exposure confidence parameter score. Similar to the "catalog score model", the external score model may include a scoring system that is based on external social media and other databases, e.g., see account applications 338, in which a search may be performed for the entire email address of the account, or the username portion of address of the account and the domain portion of address of the account may be searched separately. In continuation of the above example based on the email address "jnsmhjth19@ exampleemail.com", in the external score model, a search may be crawled across predetermined social media sites for the username handle "jnsmhjth19". In response to a determination that an exact match is not found, the fuzzy matching techniques described above may be applied to perform the search. According to some approaches, the external score model may leverage a one or more predetermined techniques to perform the search including, e.g., searching through thru an API, searching through robots, searching by flags (by checking if said server returns a null value indicating the account does not exist), searching by error (by performing a login attempt to determine if the server returns null for said username, etc.

In the process of determining the account exposure confidence parameter score, it may be determined whether the account associated with the received request is found, e.g., see decision 332. In response to a determination that the account associated with the received request is found, e.g., as illustrated by the "Yes" logical path of decision 332, the account exposure confidence parameter score may be determined based on information obtained from the location, e.g., database, website, etc., where the account is found, and the determined account exposure confidence parameter score may be stored, e.g., see operation 334, to thereafter be used to determine the final confidence score for the account. In contrast, in response to a determination that the account associated with the received request is not found, e.g., as illustrated by the "No" logical path of decision 332, the method optionally proceeds to operation 336.

Operation 336 includes performing a permutation analysis of the account in response to a determination that the account is not found during an account search. In some approaches, a predetermined account permutation engine (n) may be used to perform the permutation analysis. The predetermined account permutation engine (n) may, in some approaches, be a trained machine learning (ML) model, that is configured to perform one or more of the operations described below for using the permutation analysis to determine one of the confidence parameter scores, e.g., at least one of the confidence parameter scores (permutation analysis confidence parameter score) is determined based on the permutation analysis of the account. The permutation analysis confidence parameter score is, in some approaches, determined by using a predetermined fuzzy matching algorithm to determine variants of the account, e.g., which may be performed via a series of permutations to find potential variants of the account. These variants are preferably then fed into all subsystems as inputs for a retest that is performed, e.g., see the logical path of operation 336 return to decision 326. A second plurality of confidence parameter scores, e.g., a plurality of permutation analysis confidence parameter scores, may be determined for each of the determined variants. In some approaches, parallel operations may be performed at the same time for determining the permutation analysis confidence parameter scores. In some approaches, the permutation analysis confidence parameter score is based on whether the account is found during the permutation analysis-based account search. For example, in response to a determination that the account is found during the permutation analysis, the permutation analysis confidence parameter score may be set to a relatively higher value which may be indicative of a relatively more trusted account. In contrast, it may be determined, as a result of performing the permutation analysis, that a plurality of variant accounts exists for the account. In response to such a determination, the permutation analysis confidence parameter score may be set to a relatively lower value that may be indicative of a less trusted account. For context, existing variant accounts that have a predetermined degree of similarity with the account may result in a relatively lower confidence parameter score because the variant accounts may be generated on a relatively large scale by bots in the attempt to launch a relatively large fraudulent application of fake email accounts.

The confidence parameter scores may additionally and/or alternatively include a character analysis confidence parameter score that is determined based on a character analysis of at least the account. In some preferred approaches, the character analysis confidence parameter score is determined by analyzing a proximity and repetition of characters in a username portion of an address of the account to determine a randomness of the username portion of the address, e.g., see character proximity validation operation 340. For context, a goal of a model that may be used to determine the character analysis confidence parameter score may be to measure the randomness of the account address. This randomness characterizes whether it is considered unnatural for such parameters to be included in the same account address, and more specifically, whether it is more likely that a bot generated the parameters of the account address to thereby create a fake account. Accordingly, in some approaches, the character analysis confidence parameter score is based on the determined randomness, e.g., see character correlation and validation operation 342.

In some approaches, the character analysis confidence parameter score is determined by using predetermined dictionaries to determine a probability of sequences based on a given language. For example, a probability language model may use the following equation to calculate a probability (P) of the sequence of characters (C) in the given account address:

$$P(Cn \mid Cn-1, \ldots C1), \qquad \text{Equation (1)}$$

A predetermined database of account addresses may be referenced to calculate the probabilities. Using this approach, a probability may be determined for predetermined sequences of characters, e.g., such as "sam", "qu", "da" compared to "sss", "qt", "dp" respectively. It should be noted that, every language has predetermined defining characteristics that may be incorporated into the analysis used for determining the character analysis confidence parameter score. For example, in the English language, each word typically include a vowel, whereas in the Albanian language, characters such as "a", "s", "c", "t" and "q" are particularly defining. These particularly relevant language rules may be incorporated into the training of a model, e.g., an AI model, and thereafter used for determining the character analysis confidence parameter score, e.g., see operation 344, for an account in response to a determination of the language associated with use of an account that is being analyzed.

Further parameters that may be considered and analyzed for determining the character analysis confidence parameter score may be based on an identification that fake account addresses, e.g., fake email addresses, tend to have relatively long sequences of letters without vowels. Accordingly, these parameters that are considered may include, e.g., a relative percentage of consecutive vowel letters, a predetermined max length of consecutive vowel letters, relative percentages of consecutive letters without vowels, and a predetermined maximum length of consecutive letters without vowels.

The confidence parameter scores may additionally and/or alternatively include a structure confidence parameter score that is determined based on a structure of the account, e.g., a structure confidence parameter score. In some approaches, the structure confidence parameter score may be determined by predetermined factors. For example, method 346 includes identifying substrings of letters in a username portion of an address of the account. Substrings of numbers in the username portion of the address of the account may additionally and/or alternatively be identified. Techniques for segmenting an account address into such substrings that would become apparent to one of ordinary skill in the art upon reading the descriptions herein may be used, in some approaches. According to one of such approaches, the username portion of the account address may be clustered by a predetermined neuronal network to identify the substrings of letters in a username portion of an address of the account. In some approaches, metadata associated with the account address may be considered in the process of determining such substrings, e.g., see correlation of structure with available metadata operation 348. Thereafter, in some approaches, method 320 includes determining a first probability that each of the substrings of letters are a name. The first probability may, in some approaches, be determined by an AI model that is trained to determine the structure confidence parameter score. This trained AI model may use a recursive neuronal network trained with predetermined dictionaries to determine a probability that a given sequence is equal to a name based on a given or determined language. Method 320 may additionally and/or alternatively include determining a second probability that each of the substrings of numbers are a year. This trained AI model may be caused, e.g., instructed, to use a recursive neuronal network trained with common date formats to determine a probability that a given sequence of numbers equals a date based on a given or determined region. The structure confidence parameter score is based on the first probability and the second probability, e.g., see operation 350. For example, in some approaches, the structure confidence parameter score may be a determined weighted average of the first probability and the second probability.

The confidence parameter scores may additionally and/or alternatively include a maturity correlation confidence parameter score that is determined based on a maturity correlation of the account, e.g., a maturity confidence parameter score. The maturity confidence parameter score may, in some approaches, be determined by determining an age of a domain portion of an address of the account, e.g., see domain maturity validation operation 352. In one approach, an age of the domain portion of the address of the account may be determined by gathering data from a predetermined characterization website, e.g., such as "Whois" information which may include an age of the account address, servers used by the account, etc. In another approach, the age of the domain portion of the address of the account may be determined by researching and/or determining whether the domain of the account address is a free or private domain. Note that a free domain may be assigned a relatively lower maturity correlation confidence parameter score than is otherwise assigned to a private domain.

A number of subdomains may additionally and/or alternatively be determined and factored into the determination of the age of the domain portion of the address of the account, e.g., a domain score determined by a domain model for the account. For example, it may be considered that fake domains usually do not have subdomains as this is too much work for the scammer to upkeep on a plurality of different fake accounts. Accordingly, an account determined to have more than a predetermined threshold number of subdomains, e.g., one, two ten, etc., may be assigned a relatively higher maturity correlation confidence parameter score than is otherwise assigned to an account determined to have no subdomains. In some other approaches, a total number of emails received from the domain may also be considered where a relatively extensive number of emails being received may be determined to be indicative of a fake account, and thereby be assigned a relatively lower maturity confidence parameter score. A number of risky emails with this domain may additionally and/or alternatively be a factor considered for determining the maturity confidence parameter score.

The maturity confidence parameter score may additionally and/or alternatively be determined by determining an age of an IP addresses associated with the account, e.g., an IP score determined by an IP model for the account, e.g., see email maturity validation operation 354. In some approaches, the age of the IP addresses associated with the account may be determined from one or more features including, e.g., an age of the IP, a total number of emails sent and/or received from this IP address, a number of risky emails sent and/or received from this IP address, an associate with IP reputation scoring API, etc. It may be noted that a difference between domain and IP is that IP may have a relatively broader scope because a new domain may show up a "clean" domain because the domain was recently purchased. However, by incorporating IP, it may be identified if the new domain is just a new domain added to a potentially malicious server.

The maturity confidence parameter score may be based on the determined ages, e.g., see maturity correlation operation 356. For example, in one preferred approach, the maturity confidence parameter score is a weighted average of the determined domain score and the determined IP score.

Operation 328 includes using the determined confidence parameter scores to determine the final confidence score for the account. In some preferred approaches, the outputs of at least some of the operations described above include the determined confidence parameter scores, e.g., see the five determined confidence parameter scores described above. In some approaches, different predetermined hyperparameters may be applied to the different confidence parameter scores in order to apply different weights to the different calculated confidence parameter scores in the determination of the final confidence score.

In some approaches, the determined confidence parameter scores may be output to and consumed by another party, e.g., the user device from which the request is received, a third party to assign a risk level to each account, a user device of an administrator, etc. The determined final confidence score may additionally and/or alternatively be output to one or more of these parties.

Although, in some approaches, the final confidence score is saved, e.g., to a predetermined database for future reference, in some preferred approaches, the final confidence score is additionally and/or alternatively applied to mitigate fraud. Applying the determined final confidence score to mitigate fraud, in some approaches, includes comparing the determined final confidence score to a predetermined fraud mitigation threshold, e.g., which may be a number, a range of numbers, etc. The predetermined fraud mitigation threshold may be set to an initial value by a user device used by an administrator in some approaches, and may be dynamic. For example, the predetermined fraud mitigation threshold may be dynamically increased in response to a determination that a current threat is detected. This way, an overall accuracy and relatively efficiency for mitigating fake accounts is refined and improved over time. For example, in response to a determination that a fake account has sent a request to one or more predetermined user devices, the predetermined fraud mitigation threshold may be dynamically increased, e.g., a predetermined amount. Based on this comparison, in response to a determination that the determined final confidence score matches or exceeds the predetermined fraud mitigation threshold, in some approaches, method 320 includes performing a predetermined fraud mitigation operation. In some preferred approaches, such a predetermined fraud mitigation operation includes outputting, to the user device from which the email validation request is received, a first flag that indicates that the account is fraudulent. Various other predetermined fraud mitigation operations that may additionally and/or alternatively be performed in response to the determination that the determined final confidence score matches or exceeds the predetermined fraud mitigation threshold include, e.g., causing (instructing) client devices to block communications from the account, blocking requests and/or communication from user devices that use the account, causing (instructing the launching of) predetermined scanning operations to be performed on user devices determined to have already interacted with the user devices that use the account, performing a predetermined auditing on assets determined to be potentially fraudulently accessed by a user device that uses the account, etc. It should be noted that, as a result of performing one or more of the predetermined fraud mitigation operations described above, a relatively significant amount of processing potential that would otherwise be expended in recovering from interacting with such fake accounts is preserved. The extent of this performance benefit increases with each instance of a fake account being identified and responded to with one or more of the predetermined fraud mitigation operations described herein.

In contrast, in response to a determination that the determined final confidence score is less than the predetermined fraud mitigation threshold, method 320 includes outputting, to the user device, a second flag that indicates that the account is not fraudulent.

In some approaches, each of the confidence parameter scores mentioned above may be generated by a separate trained machine learning (ML) model that is optimized for that component. Accordingly, method 320 optionally includes causing, e.g., training and/or instructing, the trained ML models to generate the confidence parameter scores. In some approaches, each of the AI models may first be trained to determine a respective one of the confidence parameter scores. One or more of these approaches may include training the AI models using at least one predetermined training set of data. For example, a predetermined training data set may be applied to an initial and untrained version of a first of the AI models with an instruction that the initial and untrained version of the AI model is to attempt to estimate a first of the confidence parameter scores for data of the predetermined training set of data. This process may be used to learn how to process received information such as email information in one or more operations described herein. Initial training may include reward feedback that may, in some approaches, be implemented using a subject matter expert (SME) who has access to known answers for the predetermined training set of data, e.g., a correct confidence parameter score for the predetermined training set of data. However, to prevent costs associated with relying on manual actions of a SME, in another approach, reward feedback may be implemented using techniques for training a Bidirectional Encoder Representations (BERT) model, as would become apparent to one skilled in the art after reading the present disclosure. Once a determination is made that the AI model has achieved a redeemed threshold of accuracy of calculating a confidence parameter score during this training, a decision that the model is trained and ready to deploy for performing techniques and/or operations of method 300 and/or method 320 may be performed. In some further approaches, the AI model may be a neuromyotonic AI model that may improve performance of computer devices in an infrastructure associated with the operations described herein, e.g., such as the predetermined database, e.g., see decision 326, because the neuromyotonic AI model may not need a SME and/or iteratively applied training with reward feedback in order to accurately perform operations described herein. Instead, the neuromyotonic AI model is configured to itself make determinations described in operations herein.

The operations of method 320 preferably do not collect and/or analyze user information without explicit permission from users to do so. In sharp contrast to collecting and analyzing user information without explicit permission from users to do so, the operations described herein protect personal and confidential user data by performing operations to determine a final confidence score that is applied to mitigate fraud. As indicated elsewhere above, fake accounts are relatively frequently responsible for exploiting user data by dishonestly tricking users into trusting the fake account (that is not known to be fake to the tricked users) and thereafter fraudulently stealing from the tricked users, e.g., stealing money, stealing private information, stealing time, etc. Accordingly, the techniques described herein ultimately protect user data. Furthermore, the techniques described herein improve performance of computer systems that are subject to receiving notifications from fake accounts, e.g., subject to being approached and exploited by fake accounts. These performance improvements specifically result from processing potential being preserved by fake accounts being mitigated by being flagged before having the opportunity to attempt to exploit users of the computer systems. For example, a relatively significant amount of processing potential that would otherwise be expended in recovering from interacting with such fake accounts is preserved in each instance of a fake account being identified and responded to with a predetermined fraud mitigation operation. In fact, consideration of the confidence parameter scores described herein to determine the final confidence score for an account has heretofore not been considered in conventional applications. This is evident in the longstanding need in the field of account services for techniques that mitigate the relatively extensive use of fake accounts to take advantage of unsuspecting users approached by use of such fake accounts. Accordingly, the inventive discoveries disclosed herein with regards to determining confidence parameter scores to determine a final confidence score for an account proceed contrary to conventional wisdom.

Figure 3C:
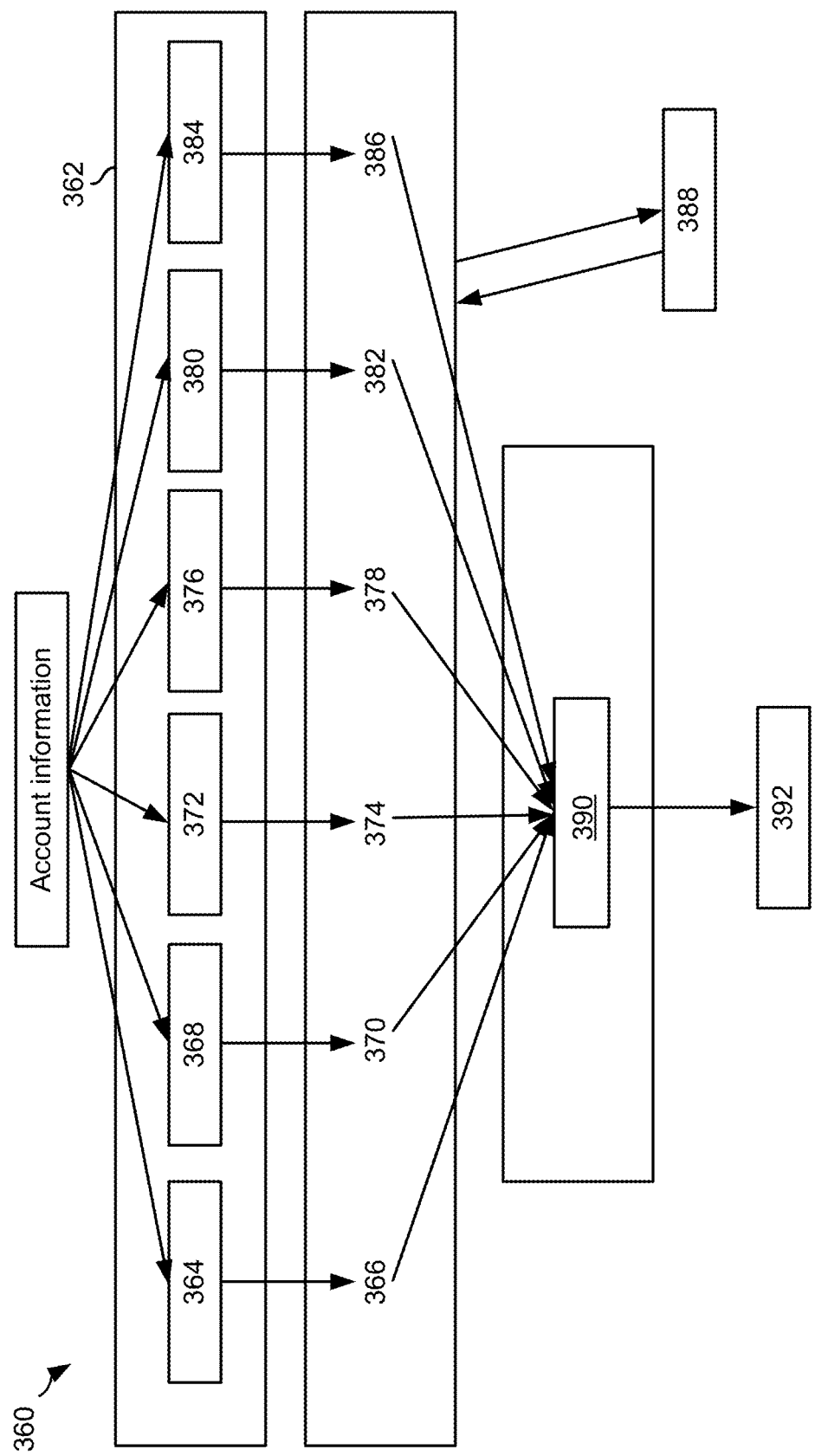
FIG. 3C is a representation, in accordance with one embodiment of the present invention.

FIG. 3C depicts a representation 360, in accordance with one embodiment. As an option, the present representation 360 may be implemented in conjunction with features from any other embodiment listed herein, such as those described with reference to the other FIGS. Of course, however, such representation 360 and others presented herein may be used in various applications and/or in permutations which may or may not be specifically described in the illustrative embodiments listed herein. Further, the representation 360 presented herein may be used in any desired environment.

It may be prefaced that representation 360 is an overview of the flowcharts of FIGS. 3A-3B. More specifically, representation 360 illustrates a logical flow of determining confidence parameter scores to determine a final confidence score for an account. For example, account information for a first account may be used by a plurality of trained AI models of a base learning infrastructure 362 to determine a plurality of confidence parameter scores. For example, the base learning infrastructure 362 may include a first trained AI structure model 364 configured to determine a first model probability 366 that includes a structure confidence parameter score that is determined based on a structure of the account. The base learning infrastructure 362 may additionally and/or alternatively include a second trained AI randomness model 368 configured to determine a second model probability 370 that includes a character analysis confidence parameter score that is determined based on a character analysis of the account. The base learning infrastructure 362 may additionally and/or alternatively include a third trained AI domain model 372 configured to determine a third model probability 374 that includes a maturity confidence parameter score that is determined based on a domain of the account. The base learning infrastructure 362 may additionally and/or alternatively include a fourth trained AI IP model 376 configured to determine a fourth model probability 378. The maturity confidence parameter score may be determined based on an IP of the account in addition to and/or alternative to the domain of the account. The base learning infrastructure 362 may additionally and/or alternatively include a fifth trained AI catalog model 380 configured to determine a fifth model probability 382 that includes an account exposure confidence parameter score that is determined based on an exposure of the account. A sixth trained AI external model may additionally and/or alternatively be configured to determine the fifth model probability 382 that includes the account exposure confidence parameter score. The base learning infrastructure 362 may additionally and/or alternatively include a sixth trained AI permutation model 384 configured to determine a sixth model probability 386 that includes an account permutation confidence parameter score.

An optional operation 388 includes ranking the model probabilities, e.g., scores, to identify flags and determine make the predictions explainable, e.g., such as the account email address is risky based on an identified untrustworthy associated IP. The model probabilities are then fed into a predetermined final classifier 390 that is configured to use the determined confidence parameter scores to determine the final confidence score 392 for the account.

Figure 4:
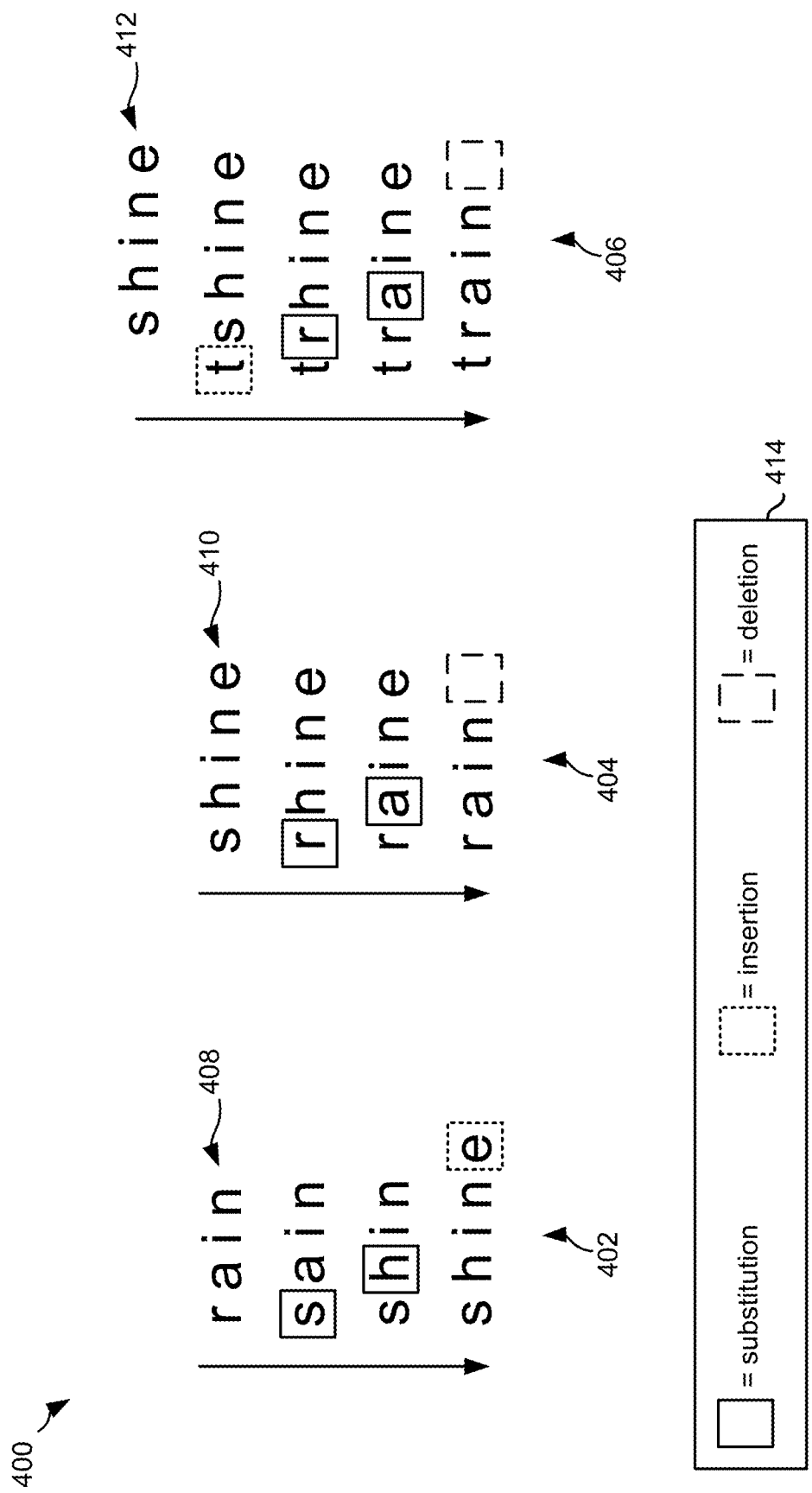
FIG. 4 is a representation of calculating similarities for character strings, in accordance with one embodiment of the present invention.

FIG. 4 depicts a representation 400 of calculating similarities for character strings, in accordance with one embodiment. As an option, the present representation 400 may be implemented in conjunction with features from any other embodiment listed herein, such as those described with reference to the other FIGS. Of course, however, such representation 400 and others presented herein may be used in various applications and/or in permutations which may or may not be specifically described in the illustrative embodiments listed herein. Further, the representation 400 presented herein may be used in any desired environment.

The representation 400 includes a plurality of samples 402, 404 and 406. In each of these samples, a root word, e.g., see root word "rain" 408, root word "shine" 408 and root word "shine" 412, may be determined from the account address, e.g., preferably the username of the address. Similarities are, in some approaches, calculated for these root words using a fuzzy matching algorithm, such as Levenshtein algorithm. For example, variants of the root words (see words below the root words) are determined using predetermined principles of substitution, insertion and/or deletion of the algorithm, e.g., see principles legend 414. These variants may be used in accordance with the techniques of the account permutation engine described elsewhere herein, e.g., see method 320. For example, these techniques may be used to determine that an account email "dsgfsggh19@exampleemail.com" that is not found is associated with the account email "dsgfsggh18@ exampleemail-.com" which has previously been tagged as malicious.

Figure 5:
FIG. 5 is a representation of a table, in accordance with one embodiment of the present invention.

FIG. 5 depicts a table 500, in accordance with one embodiment. As an option, the present table 500 may be implemented in conjunction with features from any other embodiment listed herein, such as those described with reference to the other FIGS. Of course, however, such table 500 and others presented herein may be used in various applications and/or in permutations which may or may not be specifically described in the illustrative embodiments listed herein. Further, the table 500 presented herein may be used in any desired environment.

The table 500 includes a plurality of scores that may be used to determine a character analysis confidence parameter score for an account. Each of the scores determined for an account are for different predetermined features, e.g., see % of letters, % of special letters, and % of repeat characters. For the account address "johnsmith1995@" the character analysis confidence parameter scores are determined to be relatively high, e.g., see confidence scores of 5/5. Note that the character analysis confidence parameter score for an account may be an average of the different character analysis confidence parameter scores. These relatively high character analysis confidence parameter scores may be, at least in part, based on the account address "johnsmith1995@" including words with vowels in them, e.g., name "john" and "smith." In contrast, for the account address "jj.7n_ss_mm_452223@" the character analysis confidence parameter scores are determined to be relatively low, e.g., see confidence scores of 2/5. These relatively low character analysis confidence parameter scores may be, at least in part, based on the account address "jj.7n_ss_mm_452223@" including strings of characters that are not words and that do not include vowels, e.g., see "jj", "7n" "mm." Another example of this would be the account email address "john2345doe@exampleemail.com" being determined to have a relatively higher character analysis confidence parameter score than "jdsdfw@ exampleemail.com".

Figure 6A:
FIGS. 6A-6C include representations of tables, in accordance with several embodiments.
Figure 6B:
Figure 6C:

FIGS. 6A-6C depicts tables 600, 620 and 640, in accordance with several embodiments. As an option, the present tables 600, 620 and 640 may be implemented in conjunction with features from any other embodiment listed herein, such as those described with reference to the other FIGS. Of course, however, such tables 600, 620 and 640 and others presented herein may be used in various applications and/or in permutations which may or may not be specifically described in the illustrative embodiments listed herein. Further, the tables 600, 620 and 640 presented herein may be used in any desired environment.

Referring first to FIG. 6A, table 600 includes two different account addresses, e.g., see first account address "johnsmith1995@email.com" and second account address "jj.7n_ss_mm_452223@email.com" that are broken down into substrings, e.g., using one or more techniques described elsewhere herein. The first account address includes considerably less substrings than the second account address.

Referring now to FIG. 6B, the table 620 includes names that are determined to match some of the substrings of the first account address. In response to some of the substrings of the first account address being determined to match names, the first account address is assigned a relatively high confidence parameter score, e.g., see 5/5. In contrast, none of the substrings of the second account address are determined to match names, e.g., of a predetermined directory of names. Accordingly, in response to none of the substrings of the second account address being determined to match names, the second account address is assigned a relatively low confidence parameter score, e.g., see zero.

Referring now to FIG. 6C, the table 640 includes years that are determined to match some of the substrings of the first account address. In response to some of the substrings of the first account address being determined to match a year, e.g., 1995, the first account address is assigned a relatively high confidence parameter score, e.g., see 5/5. In contrast, none of the substrings of the second account address are determined to match years, e.g., of a predetermined directory of potential years. Accordingly, in response to none of the substrings of the second account address being determined to match a year, the second account address is assigned a relatively low confidence parameter score, e.g., see zero.

FIG. 7 depicts a representation 700, in accordance with one embodiment. As an option, the present representation 700 may be implemented in conjunction with features from any other embodiment listed herein, such as those described with reference to the other FIGS. Of course, however, such representation 700 and others presented herein may be used in various applications and/or in permutations which may or may not be specifically described in the illustrative embodiments listed herein. Further, the representation 700 presented herein may be used in any desired environment.

Representation 700 includes a plurality of determined confidence parameter scores, e.g., see first confidence parameter score 702, second confidence parameter score 704, third confidence parameter score 706, fourth confidence parameter score 708, and fifth confidence parameter score 710. The confidence parameter scores may be used to determine the final confidence score using one or more of the techniques described elsewhere herein. For example, in one approach, a plurality of predetermined dynamic hyperparameters may be applied to the determined confidence parameter scores, and the final confidence score may be determined as a weighted average of the determined confidence parameter scores after being multiplied by the hyperparameters.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method, comprising:
receiving, from a user device, a request for determining a final confidence score for an account;
determining a plurality of confidence parameter scores using information associated with the account, wherein a first of the confidence parameter scores is determined based on an analysis of a structure of the account, wherein a second of the confidence parameter scores is determined based on a character analysis of at least the account, where the second of the confidence parameter scores is determined by analyzing a proximity and repetition of characters in a username portion of an address of the account to determine a randomness of the username portion of the address, where the second of the confidence parameter scores is based on the determined randomness, where the characters of the username portion are analyzed to determine whether a sequence of the characters in the username portion indicate a likelihood that the username portion was generated by a bot, wherein a third of the confidence parameter scores is determined based on an exposure of the account;

using the determined confidence parameter scores to determine the final confidence score for the account;

applying the determined final confidence score to mitigate fraud; and in response to applying the determined final confidence score to mitigate fraud, causing fraud to be mitigated by at least one of causing the user device to block communications from the account or causing the user device to block requests from another user device that uses the account;

wherein a predetermined database of account addresses is referenced to determine whether the sequence of the characters in the username portion indicates the likelihood that the username portion was generated by the bot; and wherein the sequence of the characters in the username portion is analyzed based on predetermined defining characteristics in a language.

2. The computer-implemented method of claim 1, wherein the first confidence parameter score is determined by: identifying substrings of letters in a username portion of an address of the account, identifying substrings of numbers in the username portion of the address of the account, determining a first probability that each of the substrings of letters are a name, and determining a second probability that each of the substrings of numbers are a year, wherein the first confidence parameter score is based on the first probability and the second probability.

3. The computer-implemented method of claim 1, wherein the third confidence parameter score is determined by: building a plurality of lookup tables, wherein each of the lookup tables are based on factors selected from the group consisting of: email addresses, domains, and Internet Protocol (IP) addresses, wherein building the lookup tables includes: calculating risk scores for the account, calculating risk scores for usernames having at least a predetermined degree of similarity with a username portion of an address of the account, and storing the calculated risk scores in an associated one of the lookup tables, wherein the third confidence parameter score is a weighted average of the calculated risk scores.

4. The computer-implemented method of claim 1, wherein a fourth of the confidence parameter scores is determined based on a maturity correlation of the account, wherein the fourth confidence parameter score is determined by: determining an age of a domain portion of an address of the account, determining an age of an Internet Protocol (IP) addresses associated with the account, wherein the fourth confidence parameter score is based on the determined ages.

5. The computer-implemented method of claim 4, wherein a fifth of the confidence parameter scores is determined based on a permutation analysis of the account performed in response to a determination that the account is not found during an account search, wherein the fifth confidence parameter score is determined by: using a predetermined fuzzy matching algorithm to determine variants of the account, wherein a second plurality of confidence parameter scores are determined for each of the determined variants, wherein the fifth confidence parameter score is based on whether the account is found during the account search.

6. The computer-implemented method of claim 5, wherein each of the confidence parameter scores are generated by a separate trained machine learning (ML) model, and comprising: causing the trained ML models to generate the confidence parameter scores.

7. The computer-implemented method of claim 5, wherein the predetermined fuzzy matching algorithm is a Levenshtein algorithm.

8. The computer-implemented method of claim 1, wherein applying the determined final confidence score to mitigate fraud includes: comparing the determined final confidence score to a predetermined fraud mitigation threshold; in response to a determination that the determined final confidence score exceeds the predetermined fraud mitigation threshold, performing a predetermined fraud mitigation operation, wherein the predetermined fraud mitigation operation includes outputting, to the user device, a first flag that indicates that the account is fraudulent; and in response to a determination that the determined final confidence score is less than the predetermined fraud mitigation threshold, outputting, to the user device, a second flag that indicates that the account is not fraudulent.

9. A computer program product, the computer program product comprising a computer readable storage medium having program instructions embodied therewith, the program instructions executable by a computer to cause the computer to:

receive, by the computer from a user device, a request for determining a final confidence score for an account;

determine, by the computer, a plurality of confidence parameter scores using information associated with the account, wherein a first of the confidence parameter scores is determined based on an analysis of a structure of the account, wherein a second of the confidence parameter scores is determined based on a character analysis of at least the account, where the second of the confidence parameter scores is determined by analyzing a proximity and repetition of characters in a username portion of an address of the account to determine a randomness of the username portion of the address, where the second of the confidence parameter scores is based on the determined randomness, where the characters of the username portion are analyzed to determine whether a sequence of the characters in the username portion indicate a likelihood that the username portion was generated by a bot, wherein a third of the confidence parameter scores is determined based on an exposure of the account;

use, by the computer, the determined confidence parameter scores to determine the final confidence score for the account;

apply, by the computer, the determined final confidence score to mitigate fraud; and in response to applying the determined final confidence score to mitigate fraud, causing fraud to be mitigated by at least one of causing the user device to block communications from the account or causing the user device to block requests from another user device that uses the account;

wherein a predetermined database of account addresses is referenced to determine whether the sequence of the characters in the username portion indicates the likelihood that the username portion was generated by the bot; and wherein the sequence of the characters in the username portion is analyzed based on predetermined defining characteristics in a language.

10. The computer program product of claim 9, wherein the first confidence parameter score is determined by: identifying substrings of letters in a username portion of an address of the account, identifying substrings of numbers in the username portion of the address of the account, determining a first probability that each of the substrings of letters are a name, and determining a second probability that each of the substrings of numbers are a year, wherein the first confidence parameter score is based on the first probability and the second probability.

11. The computer program product of claim 9, wherein the third confidence parameter score is determined by: building a plurality of lookup tables, wherein each of the lookup tables are based on factors selected from the group consisting of: email addresses, domains, and Internet Protocol (IP) addresses, wherein building the lookup tables includes: calculating risk scores for the account, calculating risk scores for usernames having at least a predetermined degree of similarity with a username portion of an address of the account, and storing the calculated risk scores in an associated one of the lookup tables, wherein the third confidence parameter score is a weighted average of the calculated risk scores.

12. The computer program product of claim 9, wherein a fourth of the confidence parameter scores is determined based on a maturity correlation of the account, wherein the fourth confidence parameter score is determined by: determining an age of a domain portion of an address of the account, determining an age of an Internet Protocol (IP) addresses associated with the account, wherein the fourth confidence parameter score is based on the determined ages.

13. The computer program product of claim 12, wherein a fifth of the confidence parameter scores is determined based on a permutation analysis of the account performed in response to a determination that the account is not found during an account search, wherein the fifth confidence parameter score is determined by: using a predetermined fuzzy matching algorithm to determine variants of the account, wherein a second plurality of confidence parameter scores are determined for each of the determined variants, wherein the fifth confidence parameter score is based on whether the account is found during the account search.

14. The computer program product of claim 13, wherein each of the confidence parameter scores are generated by a separate trained machine learning (ML) model, and the program instructions executable by the computer to cause the computer to: cause, by the computer, the trained ML models to generate the confidence parameter scores.

15. The computer program product of claim 13, wherein the predetermined fuzzy matching algorithm is a Levenshtein algorithm.

16. The computer program product of claim 9, wherein applying the determined final confidence score to mitigate fraud includes: comparing the determined final confidence score to a predetermined fraud mitigation threshold; in response to a determination that the determined final confidence score exceeds the predetermined fraud mitigation threshold, performing a predetermined fraud mitigation operation, wherein the predetermined fraud mitigation operation includes outputting, to the user device, a first flag that indicates that the account is fraudulent; and in response to a determination that the determined final confidence score is less than the predetermined fraud mitigation threshold, outputting, to the user device, a second flag that indicates that the account is not fraudulent.

17. A system, comprising:
a hardware processor; and
logic integrated with the processor, executable by the processor, or integrated with and executable by the processor, the logic being configured to:
receive, from a user device, a request for determining a final confidence score for an account;
determine a plurality of confidence parameter scores using information associated with the account,
wherein a first of the confidence parameter scores is determined based on an analysis of a structure of the account,
wherein a second of the confidence parameter scores is determined based on a character analysis of at least the account, where the second of the confidence parameter scores is determined by analyzing a proximity and repetition of characters in a username portion of an address of the account to determine a randomness of the username portion of the address, where the second of the confidence parameter scores is based on the determined randomness, where the characters of the username portion are analyzed to determine whether a sequence of the characters in the username portion indicate a likelihood that the username portion was generated by a bot,
wherein a third of the confidence parameter scores is determined based on an exposure of the account;
use the determined confidence parameter scores to determine the final confidence score for the account;
apply the determined final confidence score to mitigate fraud; and
in response to applying the determined final confidence score to mitigate fraud, cause fraud to be mitigated by at least one of causing the user device to block communications from the account or causing the user device to block requests from another user device that uses the account;
wherein a predetermined database of account addresses is referenced to determine whether the sequence of the characters in the username portion indicates the likelihood that the username portion was generated by the bot; and
wherein the sequence of the characters in the username portion is analyzed based on predetermined defining characteristics in a language.

18. The system of claim 17, wherein the first confidence parameter score is determined by: identifying substrings of letters in a username portion of an address of the account, identifying substrings of numbers in the username portion of the address of the account, determining a first probability that each of the substrings of letters are a name, and determining a second probability that each of the substrings of numbers are a year, wherein the first confidence parameter score is based on the first probability and the second probability.

* * * * *